Dec. 24, 1968  A. E. USHAKOFF  3,418,209

RED CELL PRESERVATION

Filed June 16, 1964

INVENTOR
ALEXIS E. USHAKOFF
BY
*Kenway, Jenney and Hildreth*
ATTORNEYS

United States Patent Office 3,418,209
Patented Dec. 24, 1968

3,418,209
RED CELL PRESERVATION
Alexis E. Ushakoff, Beverly, Mass., assignor to Cordis Corporation, Miami, Fla., a corporation of Florida
Filed June 16, 1964, Ser. No. 375,573
11 Claims. (Cl. 195—1.8)

ABSTRACT OF THE DISCLOSURE

Red blood cells are rendered storable at normal temperatures, 4–20° C., by equilibrating them with a glycerin solution containing at least 60% glycerin by volume.

---

Figure 1:
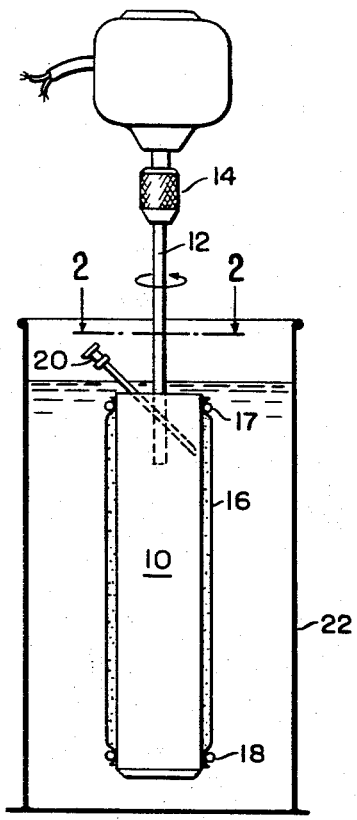

This invention relates to blood preservation and provides a method of storing red blood cells for long periods without the necessity of freezing or other environmental control.

The need for better methods of preserving and storing red blood cells is currently well recognized. With refrigeration whole blood may be stored for about three weeks, and longer periods of storage may be attained through techniques for freezing the blood. All of these methods, however, require refrigeration, and blood supplies utilizing them are thus susceptible to destruction in the event of a power loss or damage to the refrigeration systems.

The present invention overcomes limitations on red cell storage occasioned by the need of freezing, and is based on the discovery that red cells may be preserved at normal temperatures, 4°–20° C., if a substantial part of the cell water is replaced with glycerol.

The treatment of red cells with glycerol is a known procedure used in conjunction with the currently known freezing techniques developed at the Chelsea Naval Hospital. In this the cells are brought to a glycerol concentration of about 40 percent, before being frozen, and after being thawed the cells are equilibrated with an isotonic aqueous solution to remove the glycerol and return them to a condition comparable to that existing in whole blood.

According to this invention optimum conditions for storage without freezing or refrigeration are reached when the cells are brought to a glycerol concentration of about 60 percent by volume. The treatment consists essentially of treating cells that have been equilibrated to a 40 percent glycerol content according to known procedures with a 60 percent glycerol-water solution. This may be carried out in a single step simply by adding the 60 percent glycerol-water mixture to packed red cells collected (e.g., by centrifuging) from the 40 percent glycerol-water mixture. Preferably, however, the increase in glycerol content is brought about more gradually, for instance through steps in which the glycerol content is progressively increased, or by the use of dialysis equipment in which the 60 percent glycerol-water mixture is dialysed against cells equilibrated with a 40 percent glycerol-water mixture so that the glycerol content increases gradually.

It appears that the treatment with glycerol-water mixtures results in a replacement of the cell liquids with glycerol in a process of solvent substitution. After the glycerol has been substituted for the cell water, the cells may be separated from the glycerol mixture and stored. If, however, they are maintained in contact with the glycerol-water mixture a gradual tendency to continue to absorb glycerol has been observed, which results in eventual swelling and hemolysis of the cells. This effect is particularly significant at very high glycerol concentrations.

Certain additives which protect the cells against the swelling effects of glycerol have been found; preferred are the sodium and potassium salts of citric acid in combination with sucrose. The amount of additive required appears to be a function of the glycerol concentration. At 60 percent glycerol the cells appear to be stable without additives at all, while at 100 percent glycerol, the addition of sucrose to a concentration of about 20 percent by weight, and of sodium citrate to a concentration of about 4 percent by weight proved entirely effective. Higher concentrations of additives may also be employed without deleterious effects, but at substantially lower concentrations hemolysis occurs upon prolonged (9 weeks) storage.

Cells processed as described above have been stored for periods up to six weeks at temperatures between 4° C. and 20° C. without showing any apparent degradation or deterioration.

The amount of glycerol or glycerol-water mixture present with the cells during storage may vary considerably. As much as six times the volume of the original blood sample of glycerol or glycerol and water mixtures have been employed. Alternatively the cells may be stored in the packed condition which results when the cells are concentrated by gravity settling or centrifuging and separated from the supernatant liquid. It has further been found that the cells may be freed of essentially all excess (unabsorbed or extra cellular) glycerol or glycerol-water mixture to yield a clear ruby red transparent mass in which individual cells are invisible to microscopic examination, indicating a lack of interface between them, and then reconstituted without apparent damage. This technique is useful since removal of all excess liquid effectively prevents the cells from swelling.

Following storage the cells may be reconstituted by essentially reversing the processing steps to replace the glycerol or glycerol-water mixture with a liquid having the same isotonic qualities as blood plasma. This is carried out by progressively bringing the cells into glycerol-water mixtures of decreasing glycerol concentration until the glycerol concentration is around 40 percent, following which currently known techniques for reconstituting the cells may be employed. If the cells have been stored in the presence of glycerol at a 60 percent glycerol concentration, reconstitution to the 40 percent glycerol concentration level can be accomplished by dialysing the cell suspension against a 40 percent glycerol-water mixture until equilibrium is attained. Alternatively, the 60 percent glycerol suspension can be centrifuged to separate the cells, which are then resuspended in the 40 percent glycerol-water mixture.

If the cells have been stored in a suspension of higher glycerol concentrations, a gradual lowering of the glycerol concentration can be achieved by adding a glycerol-water mixture of lower glycerol content to bring about an initial gradual lowering, following which dialysis or repeated resuspension steps may be undertaken. If the cells have been stored at 100 percent glycerol content, the mixture is extremely viscous and is preferably mixed with an equal volume of a 60 percent glycerol-water mixture to reduce the glycerol content to about 80 percent. This mixture may then be centrifuged to separate the cells following which they are resuspended in 60 percent glycerol-water mixture, then centrifuged again and resuspended in a 40 percent glycerol-water mixture.

Alternatively, the 100 percent glycerol suspension may be placed in dialyzing equipment and dialyzed against a 60 percent glycerol-water mixture until equilibrium is attained, following which it is dialyzed against a 40 percent glycerol-water mixture.

If the cells have been stored free of excess (unabsorbed or extra cellular) glycerol or glycerol-water mixture, it is a convenient first to resuspend the cells in a glycerol or glycerol-water mixture of the same concentration as that in which the cells were suspended prior to the removal of the excess. The resulting suspension may then be processed as described above. Alternatively, the packed cells may be first "unpacked" by dialyzing the packed mass against glycerol-water mixtures of progressively increasing water content.

In the foregoing discussion, the designation of the glycerol content of the cells refers in actuality to the glycerol content of the solution with which the cells have been brought to equilibrium, and should not be taken necessarily as the glycerol content actually present inside the cells. The figures are, moreover, given as percent by volume calculated from the volume made up by the addition of the glycerol to water. Accordingly, a 60 percent glycerol-water mixture would be made by adding to 40 cc. of water sufficient glycerol to make up a final volume of 100 cc. The concentrations of dissolved solids are stated as percent by weight, and refer to the number of grams of solid material per 100 milliliters of solution. It will accordingly be understood that reference to cells having 60 percent glycerol content and 2 percent sodium citrate content means that the cells are in equilibrium with an aqueous solution containing 60 percent glycerol by volume (as described above) and 2 grams sodium citrate per 100 ml. of solution.

Figure 2:
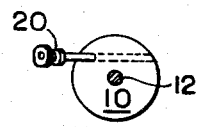

Preferred methods of practicing this invention are described in detail below, wherein reference is made to the accompanying drawing, FIGURE 1, which is an elevation of a type of dialysis apparatus suitable for use in carrying out certain embodiments of this invention. FIGURE 2 is a top plan view of the cylindrical core of the dialysis apparatus.

The processing of red cells according to the preferred embodiment of this invention makes use of three processing stages. The first is the preliminary operation in which the cells are collected and made ready for the glycerol treatment. In the second stage the cells are brought into contact with increasingly concentrated glycerol-water mixtures to the point where the glycerol content is sufficiently high to preserve the cells, with additives included as necessary to prevent cell damage. The cells may then be stored for a period which may be as long as 18 months. The third stage consists in reconstituting the cells by bringing them into contact with increasingly dilute glycerol-water mixtures until an isotonic glycerol-free suspension is provided.

In the course of this development efforts have not been made to reconstitute the cells to a glycerol concentration less than 40 percent, since known procedures are available for processing cells that have been stored at 40 percent glycerol. It is accordingly deemed well within the skill of the art to process cells from the 40 percent glycerol concentration to an essentially glycerol-free isotonic state ready for transfusion.

In the first stage of processing conventional blood handling techniques may be employed, including the steps of collecting and storing the blood, before the treatment with glycerol is undertaken. The blood may have been mixed with a standard acid-citrate-dextrose solution (referred to herein as ACD blood) and it may have been stored for a period of time under refrigeration as is customary. Alternatively the blood may have been freshly collected.

Preferably the blood is first washed to remove the plasma to yield clean red cells free of other blood constituents. For this purpose the following procedure has been employed. All operations may be carried out at room temperature unless otherwise noted.

Example I

ACD human blood that had been stored under refrigeration for three days was removed from storage and a sample containing a quantity of the red cells, which had partly settled, was drawn off by means of a syringe and placed in a centrifuge tube. To this was added an excess (about 6 times the volume of the sample) of a citrate-dextrose (CD) solution containing 1.32 grams of sodium citrate and 1.47 grams of dextrose per 100 milliliters of solution in distilled water. After mixing the cells gently with the CD solution, the suspension was centrifuged to remove the cells and the supernatant was decanted and discarded. A like quantity of CD solution was again added, the cells were agitated gently to resuspend them, and the mixture was then again centrifuged to separate the cells and the supernatant was decanted and discarded.

The foregoing operation is given as examplary of a conventional washing of red cells and is a preliminary step in the processing of the cells according to this invention.

The second step of the process consists in contacting the cells with increasingly higher concentrations of glycerol. This may be done either stepwise or through successive dialysis operations by which glycerol-water mixtures of higher concentration are brought into equilibrium with the cells.

Example II

In the stepwise operation, the twice-washed, packed cells were resuspended in an excess (six times the volume of the original blood sample) of a glycerol-water mixture containing 40 percent glycerol by volume and 2 percent by weight of sodium citrate. The mixture was added to the cells and gently agitated to bring about a resuspension, following which the cells were again centrifuged to remove the cells preliminary to a further treatment at a higher glycerol concentration. The operation was repeated in successive steps until the desired glycerol concentration (60–100 percent) was reached. In each case a volume of glycerol-water mixture about six times the volume of the original sample of cells was utilized to provide an adequate access of glycerol-water mixture, the concentration of which would not be substantially changed through the attainment of equilibrium and the pick-up of cell water.

The following mixtures may be employed, one after the other, in each case in the manner described above:

TABLE 1

| Glycerol Treatment | Second | Third | Fourth |
|---|---|---|---|
| Glycerol, percent by volume | 60 | 80 | 100 |
| Sodium citrate percent by weight | 2 | 2 | 2 |
| Sucrose, percent by weight | 5 | 10 | 20 |

Example III

Dialysis techniques are advantageously employed in the practice of this invention as they bring about a more gradual addition of glycerol to or removal of glycerol from the cells. The apparatus illustrated in the drawing consists of a core 10 of inert material, e.g., methyl methacrylate (Lucite) mounted vertically on an axial shaft 12 by means of which the apparatus may be held in a chuck 14 and rotated. The cylindrical core is surrounded by a sleeve of dialysis material 16, preferably regenerated cellulose, which is held in place at the top and bottom by elastic O-rings 17 and 18. A syringe needle 20 extends from the top of the cylinder at a skew angle and terminates at the cylindrical surface. Its upper end is fitted with a conventional syringe coupling by which a quantity of blood may be introduced between the core and the dialysis membrane. The dialysis member is conveniently suspended in a hydrometer jar 22 into which is placed the liquid against which the cells are to be dialyzed.

In a typical procedure the washed red cells were suspended in a 40 percent by volume glycerol-water mixture, as described in Example II, and injected into the dialysis unit, which was then immersed in a 60 percent by volume glycerol-water mixture containing 2 percent by weight of sodium citrate. After equilibrium was reached, as may be determined by measuring the specific gravity of the glycerol-water mixture, the 60 percent by volume glycerol-water mixture was replaced with an 80 percent by volume of glycerol-water mixture containing 2 percent by weight of sodium citrate and 10 percent by weight of sucrose. Dialysis was continued until equilibrium was again reached. The 80 percent glycerol-water mixture was then replaced by pure glycerol containing 20 percent by weight of sucrose and 2 percent by weight of sodium citrate. After equilibrium has been reached the cells may be stored.

Cells processed by any of the foregoing methods are ready for storage in sealed, sterile containers. As noted above, storage may be undertaken at normal room temperature without special environmental control. Storage is preferably in the dark at a temperature of 4° C.

The third phase of the process is the reconstitution of the cells following storage. The preferred method consists in gradually lowering the glycerol content either by reversing the steps of repeatedly separating the cells and resuspending them in mixtures of progressively lower glycerol content in the same manner as described above; that is, by centrifuging the cells out of the suspension and then adding the glycerol-water mixture of the next lower glycerol content and resuspending the cells, again separating them and repeating the process until the glycerol content is reduced to about 40 percent by volume. At this stage the cells are ready for conventional processing.

Where the cells have been stored at 100 percent glycerol content an initial dilution is convenient since the suspension is extremely viscous rendering separation by centrifuging difficult. Preferably an equal volume of the 60 percent by volume glycerol mixture is added slowly to reduce the glycerol concentration to about 80 percent following which the cells may be centrifuged off and then resuspended in the 60 percent by volume mixture. The several mixtures in this series of operations are of the same composition as set forth in Table 1 above.

Reconstitution of the cells is also conveniently carried out in the manner described in Example III, with the exception that the order of the steps is reversed, so that dialysis is carried out against mixtures of progressively lower glycerol content.

Cells stored with 100 percent glycerol may be placed in the dialysis equipment and an 80 percent by volume glycerol mixture placed around the dialysis chamber and maintained there until equilibrium is attained. Conveniently, fresh 80 percent mixture is added in the progress of the dialysis in order to maintain the glycerol concentration. After equilibrium has been reached, the 80 percent mixture is replaced by a 60 percent mixture of glycerol and dialysis is continued until equilibrium is again reached, preferably with the continued addition of 60 percent glycerol mixture to maintain the concentration. After equilibrium has been reached the 60 percent glycerol mixture is replaced with a 40 percent glycerol mixture and the procedure is again repeated until equilibrium has again been reached.

Example IV

Packed red cells that had been equilibrated at 60 percent glycerol by the procedure through the second step of Example II, were collected by centrifuging them from their suspension, and placed in the dialysis unit described in Example III. These were then dialyzed first against a mixture of 80 percent glycerol, 2 percent sodium citrate and 10 percent sucrose until equilibrium was attained, and then against a mixture of 100 percent glycerol, 2 percent sodium citrate and 20 percent sucrose. In the course of this dialysis the cells became a ruby red clear gel in which individual cells could not be detected by visual microscopic examination.

It is hypothesized that the dialysis of the packed red cells against the highly concentrated glycerol mixture resulted in the removal of water from the cells without countermigration of glycerol. Consequently the red cells become further packed to the point at which the interfaces between them become extinct. At this step there is no excess or intercellular liquid and the cells are therefore incapable of further swelling.

Reversing the dialysis steps by dialysing against the 80 percent glycerol mixture causes the cells to unpack. The individual cells again become visible as the intercellular liquid returns, and the cells appear not to have been damaged by their close packing.

Example V

Swelling of the red cells can also be prevented by removing the excess (unabsorbed or extra cellular) glycerol from them and storing the cells in a substantially water-free condition in which they contain absorbed glycerol. Such a separation may be accomplished by mixing the cell suspension containing glycerol at 60 percent concentration with an immiscible inert liquid having a density between that of the cells and that of the glycerol, and centrifuging the mixture so that the liquid of intermediate density forms a barrier separating the cells from the glycerol. A suitable liquid is a mixture of heptane and Freon 113 ($CCl_2F$—$CClF_2$) containing 36.5 percent heptane by volume and having a specific gravity of 1.224.

Packed cells processed in this manner may be reconstituted by suspending the cells in the same 60 percent glycerol mixture with which they have been equilibrated, and then processing the suspension in the manner described above.

The foregoing description sets forth representative methods for practicing this invention. It is contemplated, however, that modifications will readily occur to those skilled in the art and familiar with this disclosure, and that such may be made without departing from the scope of this invention.

Having thus disclosed my invention and described in detail preferred embodiments thereof, I claim and desire to secure by Letters Patent:

1. The method of treating red blood cells to render them storable at 4–20° C. comprising placing said cells in solvent exchange relationship with glycerol until said cells have attained a glycerol content at least that in equilibrium with a glycerol-water mixture containing 60 percent glycerol by volume.

2. The method defined by claim 1 wherein the glycerol in solvent exchange relationship with the cells contains sodium citrate in an amount providing substantial isotonic balance.

3. The method defined by claim 1 wherein the glycerol in solvent exchange relationship with the cells contains sucrose in an amount sufficient to prevent substantial swelling of the cells.

4. The method of treating red blood cells comprising treating said cells with a glycerol-water mixture containing at least 60 percent glycerol by volume, until said cells are in equilibrium with said solution, then storing said cells in said treated condition at 4–20° C.

5. The method defined by claim 4 wherein the cells are treated by contacting them with a glycerol-water mixture.

6. The method defined by claim 5 wherein the cells are treated by dialysis against a glycerol-water mixture separated from said cells by a dialysis medium.

7. The method of treating red blood cells as defined by claim 4 wherein the cells are treated successively with mixtures of increasing glycerol concentrations.

8. Processed red blood cells storable at 4–20° C. comprising red blood cells containing glycerol in an amount at least that in equilibrium with a glycerol-water mixture containing 60 percent glycerol by volume.

9. In combination red blood cells in equilibrium with with a glycerol composition containing at least 60 percent glycerol by volume.

10. In combination red blood cells in equilibrium with a glycerol composition containing at least 60 percent glycerol by volume and the rest water together with sodium citrate and sucrose in amounts sufficient to prevent hemolysis.

11. Processed red blood cells storable at 4–20° C. comprising packed red blood cells having a glycerol content in equilibrium with glycerol or a glycerol-water mixture containing at least 60 percent glycerol said cells being sufficiently in contact that individual cells are not visibly distinct and forming a transparent ruby red mass.

References Cited

H. M. Pyle et al.: The 1957 Protein Foundation Conference on Blood Components and on Tissue Preservation, January 1967 (pp. 7–8).

M. M. Ketchel: 10th Conference on the Plasma Proteins and Cellular Elements of the Blood, January 1956 (pp. 74–75).

J. L. Tullis: Conference on the Plasma Proteins and Cellular Elements of the Blood, November 1954 (pp. 25–27).

P. B. Hawk et al.: Practical Physiological Chemistry, McGraw-Hill, New York, 1954 (p. 4).

J. L. Tullis: Blood Cells and Plasma Proteins, Academic Press, New York, 1953 (pp. 208 and 213).

MORRIS O. WOLK, *Primary Examiner.*

F. T. RUDIAK, *Assistant Examiner.*

U.S. Cl. X.R.

21—58; 23—258.5; 167—74